(12) United States Patent
Gopalan et al.

(10) Patent No.: US 11,526,804 B2
(45) Date of Patent: *Dec. 13, 2022

(54) MACHINE LEARNING MODEL TRAINING FOR REVIEWING DOCUMENTS

(71) Applicant: Bank of America Corporation, Charlotte, NC (US)

(72) Inventors: Kishore Gopalan, Jersey City, NJ (US); Satish Chaduvu, Hyderabad (IN); Thomas J. Kuchcicki, Farmingville, NY (US)

(73) Assignee: Bank of America Corporation, Charlotte, NC (US)

( * ) Notice: Subject to any disclaimer, the term of this patent is extended or adjusted under 35 U.S.C. 154(b) by 273 days.

This patent is subject to a terminal disclaimer.

(21) Appl. No.: 16/552,712

(22) Filed: Aug. 27, 2019

(65) Prior Publication Data

US 2021/0065042 A1    Mar. 4, 2021

(51) Int. Cl.
*G06F 40/30* (2020.01)
*G06F 40/205* (2020.01)
(Continued)

(52) U.S. Cl.
CPC .......... *G06N 20/00* (2019.01); *G06F 40/205* (2020.01); *G06F 40/253* (2020.01); *G06F 40/30* (2020.01)

(58) Field of Classification Search
CPC ...... G06F 40/253; G06F 40/205; G06F 40/30; G06F 16/93; G06F 16/30; G06F 16/90;
(Continued)

(56) References Cited

U.S. PATENT DOCUMENTS

| 6,424,997 B1 | 7/2002 | Buskirk, Jr. et al. |
| 6,584,456 B1 | 6/2003 | Dom et al. |

(Continued)

FOREIGN PATENT DOCUMENTS

| CN | 101253514 B | 6/2012 | |
| CN | 107977415 A | * 5/2018 | ......... G06F 16/3329 |

(Continued)

OTHER PUBLICATIONS

Goplan, K. et al., "Analyzing Documents Using Machine Learning," U.S. Appl. No. 16/552,471, filed Aug. 27, 2019, 46 pages.

(Continued)

*Primary Examiner* — Paras D Shah

(57) ABSTRACT

A document analysis device that includes an artificial intelligence (AI) processing engine configured to receive a set of input sentences, to select a first sentence from the set of input sentences, and to compare the first sentence to previously classified sentences. The AI processing engine is further configured to compute similarity scores between the first sentence and the previously classified sentences, to identify a second sentence from the previously classified sentences with a similarity score greater than or equal to a similarity score threshold value, to identify a sentence type that is associated with the second sentence, and to associate the first sentence with the sentence type. The AI processing engine is further configured to add the first sentence to the set of training data for the machine learning model and to train the machine learning model using the set of training data.

17 Claims, 6 Drawing Sheets

(51) Int. Cl.
*G06F 40/253* (2020.01)
*G06N 20/00* (2019.01)

(58) Field of Classification Search
CPC ........ G06F 40/194; G06F 21/60; G06F 21/10; G06N 20/00
See application file for complete search history.

(56) References Cited

U.S. PATENT DOCUMENTS

| | | | |
|---|---|---|---|
| 6,684,202 B1 | 1/2004 | Humphrey et al. | |
| 7,149,347 B1 | 12/2006 | Wnek | |
| 7,561,734 B1 | 7/2009 | Wnek | |
| 7,764,830 B1 | 7/2010 | Wnek | |
| 7,769,759 B1 | 8/2010 | Gartung et al. | |
| 8,112,268 B2 | 2/2012 | Chen et al. | |
| 8,189,905 B2 | 5/2012 | Eaton et al. | |
| 8,239,335 B2 | 8/2012 | Schmidtler et al. | |
| 8,375,061 B2 | 2/2013 | Aggarwal | |
| 8,587,613 B2 | 11/2013 | Wang et al. | |
| 8,620,836 B2 | 12/2013 | Ghani et al. | |
| 8,948,511 B2 | 2/2015 | Ortega et al. | |
| 9,058,319 B2 | 6/2015 | Balchandran et al. | |
| 9,092,802 B1 | 7/2015 | Akella | |
| 9,195,640 B1 | 11/2015 | Donneau-Golencer et al. | |
| 9,336,689 B2 | 5/2016 | Romriell et al. | |
| 9,348,920 B1 | 5/2016 | Kesin | |
| 9,471,883 B2 | 10/2016 | Chatterjee et al. | |
| 9,646,082 B2 | 5/2017 | Al-Kofahi et al. | |
| 9,665,650 B1 | 5/2017 | Hoelzle et al. | |
| 9,818,067 B2 | 11/2017 | Miranda et al. | |
| 9,824,083 B2 | 11/2017 | Ghannam et al. | |
| 9,928,269 B2 | 3/2018 | Bradley et al. | |
| 9,934,285 B1 | 4/2018 | Rehling et al. | |
| 9,959,412 B2 | 5/2018 | Strauss et al. | |
| 10,019,535 B1 | 7/2018 | Madhani et al. | |
| 10,031,907 B2 | 7/2018 | Bell et al. | |
| 10,055,402 B2 | 8/2018 | Sengupta et al. | |
| 10,089,297 B2 | 10/2018 | Smith | |
| 10,169,305 B2 | 1/2019 | Indenbom et al. | |
| 2007/0198459 A1 | 8/2007 | Boone et al. | |
| 2009/0116755 A1 | 5/2009 | Neogi et al. | |
| 2010/0042623 A1 | 2/2010 | Feng et al. | |
| 2011/0202512 A1* | 2/2011 | Pantanelli | G06F 40/30 707/706 |
| 2011/0196870 A1 | 8/2011 | Schmidtler et al. | |
| 2011/0255782 A1 | 10/2011 | Welling et al. | |
| 2011/0255784 A1 | 10/2011 | Welling et al. | |
| 2011/0255794 A1 | 10/2011 | Neogi et al. | |
| 2012/0041937 A1 | 2/2012 | Dhillon et al. | |
| 2012/0253792 A1 | 10/2012 | Bespalov et al. | |
| 2013/0066818 A1 | 3/2013 | Assadollahi et al. | |
| 2013/0124193 A1 | 5/2013 | Holmberg | |
| 2015/0294220 A1 | 10/2015 | Oreif | |
| 2016/0350672 A1 | 12/2016 | Snyder et al. | |
| 2016/0364377 A1* | 12/2016 | Krishnamurthy | G06F 40/35 |
| 2018/0253416 A1* | 9/2018 | Crouse | G06F 40/253 715/271 |
| 2019/0197105 A1* | 6/2019 | Tagra | G06F 40/284 704/9 |

FOREIGN PATENT DOCUMENTS

| | | |
|---|---|---|
| WO | 2004097568 A2 | 11/2004 |
| WO | 2014064803 A1 | 5/2014 |
| WO | 2016066228 A1 | 5/2016 |
| WO | 2017090051 A1 | 6/2017 |

OTHER PUBLICATIONS

Goplan, K. et al., "Removing Outliers from Traning Data for Machine Learning," U.S. Appl. No. 16/552,577, filed Aug. 27, 2019, 48 pages.

Goplan, K. et al., "Identifying Similar Sentences for Machine Learning" U.S. Appl. No. 16/552,762, filed Aug. 27, 2019, 49 pages.

* cited by examiner

MACHINE LEARNING MODEL TRAINING FOR REVIEWING DOCUMENTS

TECHNICAL FIELD

The present disclosure relates generally to analyzing documents, and more specifically to analyzing documents using machine learning.

BACKGROUND

Some computer systems may want to restrict certain types of information from being distributed within a computer network. Existing computer systems are unable to identify and control access to information that is contained within documents. This means that existing systems are unable to determine whether a document contains information that should not be distributed. For example, a document may contain restricted information or other types of information that should be modified before it is distributed. The ability to understand text within a document is important for information security and data access control.

Existing computer systems may use keyword searches for controlling data access. However, this approach may be overly restrictive which can limit the throughput of the system. In addition, using keyword searches is inefficient because a large set of keywords may be necessary to describe a single term or concept. This results in numerous large sets of keywords which can consume a significant amount of memory resources. These large sets of keywords may also require a significant amount of processing resources to search documents for every keyword.

SUMMARY

Some computer systems may want to restrict certain types of information from being distributed within a computer network. Existing computer systems are unable to identify and control access to information that is contained within documents. This means that existing systems are unable to determine whether a document contains information that should not be distributed. For example, a document may contain restricted information or other types of information that should be modified before it is distributed. The ability to understand text within a document is important for information security and data access control.

Existing computer systems may use keyword searches for controlling data access. However, this approach may be overly restrictive which can limit the throughput of the system. In addition, using keyword searches is inefficient because a large set of keywords may be necessary to describe a single term or concept. This results in numerous large sets of keywords which can consume a significant amount of memory resources. These large sets of keywords may also require a significant amount of processing resources to search documents for every keyword.

The system disclosed in the present application provides a technical solution to the technical problems discussed above by using artificial intelligence and machine learning for analyzing documents in a computer system. The disclosed system provides several practical applications and technical advantages which include 1) a process for analyzing text within a document and tagging particular types of sentences within the document, 2) a process for training a machine learning model for classifying sentences within a document based on the content of the sentence and the context of the sentence with respect to other sentences, 3) a process for determining whether a sentence is similar to other sentences based on different characteristics of the sentence, and 4) a process for identifying outlier sentences within a set of training sentences for training a machine learning model to classify sentences.

In one embodiment, a document analysis system is configured to generate training data that may be used for training a machine learning model that classifies sentences from a document. The training data comprises a plurality of training sentences that are used for training the machine learning model. For example, the training data may comprise a set of previously classified sentences that are each associated with a classification identifier that indicates a sentence type. The training data may be used for adjusting weights, biases, and/or any other machine learning model parameters while training a machine learning model. This process allows the document analysis system to create training data that improves accuracy when training machine learning models by identifying similarities between sentences and/or by removing outlier sentences from the training data. Training a machine learning model using the generated training data allows the machine learning model to learn the context of sentences with respect to other sentences, for example other sentences in a document.

In one embodiment, the document analysis system may be configured to determine whether a sentence is similar to other sentences based on different characteristics of the sentences. The document analysis system may identify similarities between sentences based on words in the sentences, the grammatical structure of the sentences, or any other suitable characteristics of the sentences. For example, the document analysis system may compare a pair of sentences as part of a process for compiling training data for a machine learning model or for removing outlier sentences from training data for a machine learning model. This process allows the document analysis system to identify relationships among different sentences.

In one embodiment, the document analysis system may be configured to determine whether a sentence within a set of training data for a machine learning model is an outlier. This process allows the document analysis system to remove sentences that would degrade the accuracy and performance of training data for a machine learning model. This process improves the document analysis system's ability to more accurately train machine learning models.

In one embodiment, the document analysis system may be configured to process a document by tagging sentences in the document that are associated with a set of tagging rules for the document. Tagged sentences may be identified and presented to a user for review and/or modifications. The tagging rules may be used to identify types of sentences that need to be tagged based on their associated classification identifier. The classification identifier may uniquely identify a particular sentence type for a sentence. Examples of sentence types include, but are not limited to, restricted information, classified information, financial information, account information, speculative or predictive sentences, definitive sentences, factual sentences, opinion sentences, past tense sentences, present tense sentences, future tense sentences, contextual sentences, or any other suitable types of sentences. The document analysis system may be configured to identify sentences that are associated with sentence types that are identified by the tagging rules and to tag or annotate the identified sentences. The tagging rules may be uniquely associated with documents and/or document types. For example, a first set of tagging rules may be associated with a first type of document (e.g. an audit report)

and a second set of tagging rules may be associated with a second type of document (e.g. a business plan).

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The system disclosed in the present application provides a technical solution to the technical problems discussed above by using artificial intelligence and machine learning for analyzing documents in a computer system. The disclosed system provides several practical applications and technical advantages which include 1) a process for analyzing text within a document and tagging particular types of sentences within the document, 2) a process for training a machine learning model for classifying sentences within a document based on the content of the sentence and the context of the sentence with respect to other sentences, 3) a process for determining whether a sentence is similar to other sentences based on different characteristics of the sentence, and 4) a process for identifying outlier sentences within a set of training sentences for training a machine learning model to classify sentences.

Document Analysis System

Figure 1:
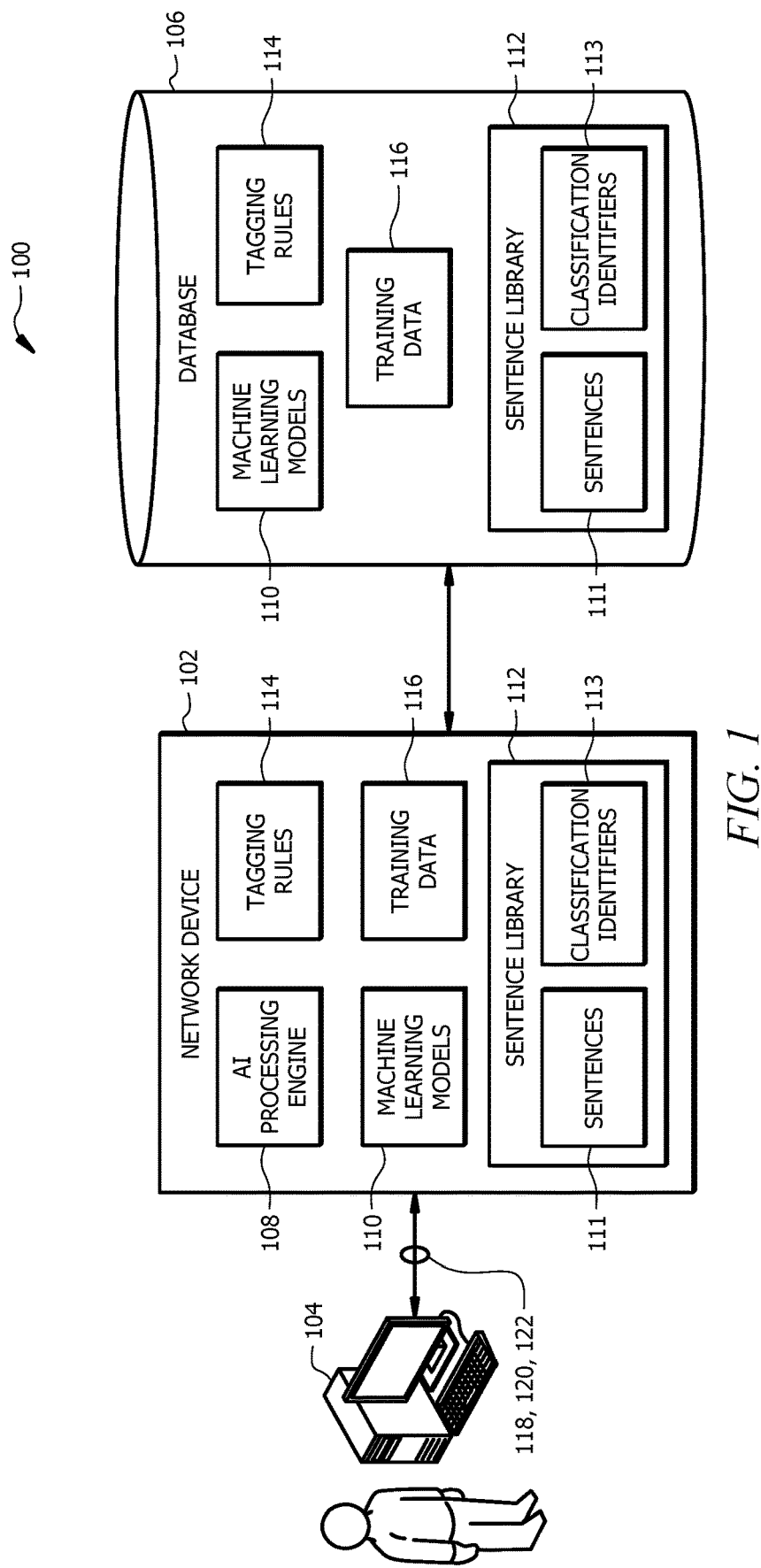
FIG. 1 is a schematic diagram of a document analysis system configured to employ machine learning.

FIG. 1 is a schematic diagram of a document analysis system 100 configured to employ machine learning. In one embodiment, the document analysis system 100 comprises a network device 102 that is in signal communication with one or more user devices 104 and/or one or more databases 106. The document analysis system 100 may be configured as shown or in any other suitable configuration.

The network device 102, the user device 104, and the database 106 are in signal communication with each other over a network connection. The network may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network may be configured to support any suitable type of communication protocol as would be appreciated by one of ordinary skill in the art. Examples of the document analysis system 100 in operation are described in FIGS. 2-5.

Network Device

In one embodiment, the network device 102 comprises an AI processing engine 108, one or more machine learning models 110, a sentence library 112, tagging rules 114, and training data 116. The network device 102 is generally configured to train machine learning models 110 and to employ machine learning to process documents 118 that comprise text. For example, the network device 102 may be configured to process documents 118 that are received from a user device 104. Examples of user devices 104 include, but are not limited to, mobile devices (e.g. smart phones or tablets), computers, laptops, or any other suitable type of device. Additional information about the hardware configuration of the network device 102 is described in FIG. 6.

The AI processing engine 108 is configured to generate training data 116 that may be used for training a machine learning model 110 that classifies sentence from a document. The training data 116 comprises one or more training sentences that are used for training machine learning models 110. For example, the training data 116 may comprise a set of previously classified sentences that are each associated with a classification identifier 113 that indicates a sentence type. The AI processing engine 108 may use the training data 116 for adjusting weights, biases, and/or any other machine learning model parameters while training a machine learning model 110. This process allows the AI processing engine 108 to create training data 116 that improves accuracy when training machine learning models 110 by identifying similarities between sentences and/or by removing outlier sentences from the training data 116. Training a machine learning model 110 using the generated training data 116 allows the machine learning model 110 to learn the context of sentences with respect to other sentences. An example of the AI processing engine 108 performing this process is described in FIG. 2.

The AI processing engine 108 may be further configured to determine whether a sentence is similar other sentences based on different characteristics of the sentences. The document analysis system may identify similarities between sentences based on words in the sentences, the grammatical structure of the sentences, or any other suitable characteristics of the sentences. For example, the AI processing engine 108 may compare a pair of sentences as part of a process for compiling training data 116 for a machine learning model 110 or for removing outlier sentences from training data 116 for a machine learning model 110. An example of the AI processing engine 108 performing this process is described in FIG. 3.

The AI processing engine 108 may be further configured to determine whether a sentence within a set of training data 116 is an outlier. This process allows the AI processing engine 108 to remove sentences that would degrade the accuracy and performance of training data 116 for a machine learning model 110. This process improves the AI processing engine's 108 ability to more accurately train machine learning models 110. An example of the AI processing engine 108 performing this process is described in FIG. 4.

The AI processing engine 108 may be further configured to process a document 116 by tagging sentences in the document 118 that are associated with tagging rules 114 for the document 118. Tagged sentences may be identified and presented to a user for review and/or modifications. The tagging rules 114 may be used to identify types of sentences that need to be tagged based on their associated classification identifier 113. For example, the tagging rules 114 may identify one or more classification identifiers 113 that correspond with sentence types for tagging sentences in a document 118. In one embodiment, the classification identifier 113 is an alphanumeric identifier. The classification identifier 113 may uniquely identify a particular sentence type for a sentence. Examples of sentence types include, but are not limited to, restricted information, classified information, financial information, account information, speculative or predictive sentences, definitive sentences, factual sentences, opinion sentences, past tense sentences, present tense sentences, future tense sentences, contextual sentences, or any other suitable types of sentences. The AI processing engine 108 may be configured to identify sentences that are associated with sentence types that are identified by the tagging rules 114 and to tag or annotate the identified sentences. In one embodiment, tagging rules 114 may be uniquely associated with documents and/or document types. For example, a first set of tagging rules 114 may be associated with a first type of document 118 (e.g. an audit report) and a second set of tagging rules 114 may be associated with a second type of document 118 (e.g. a business plan). An example of the AI processing engine 108 performing this process is described in FIG. 5.

Examples of machine learning models 110 include, but are not limited to, a multi-layer perceptron or any other suitable type of neural network model. The machine learning models 110 may comprise different types of machine learning models, for example word-embedding models and sentence classification models. For instance, a word-embedding machine learning model may be used for learning associations between different words and may be used to train a sentence classification machine learning model. A sentence classification machine learning model 110 may be configured to receive a text sentence as an input and to output a classification identifier 113 for the received input sentence. Here, the classification identifier 113 identifies a particular sentence type for the input sentence. In one embodiment, the machine learning model 110 may be configured to classify an input sentence based at least in part on verb tenses that are used in the input sentence. For example, the machine learning model 110 may be configured to classify a sentence based at least in part on whether the sentence is written in the past tense, present tense, or future tense. In one embodiment, the machine learning model 110 may be configured to classify an input sentence based at least in part on the grammatical structure of the input sentence. In one embodiment, the machine learning model 110 may be configured to classify an input based at least in part on the context or subject matter of the input sentence. In other embodiments, the machine learning model 110 may be configured to classify an input sentence based on any other characteristics or combination of characteristics of the input sentence.

The sentence library 112 comprises a plurality of previously classified sentences 111 that are each associated with a classification identifier 113 and a sentence type. For example, the sentence library 112 may contain sentences that have been previously classified by a machine learning model 110. The AI processing engine 108 may compare sentences to the previously classified sentences 111 in the sentence library 112 to determine whether a sentence is similar to any of the previously classified sentences Databases In one embodiment, a database 106 is a device that is external from the network device 102. For example, a database 106 may be a data store, a server, a network attached storage (NAS) device, a computing device, a shared folder, or any other suitable type of network device. In another embodiment, a database 106 may be integrated with a memory (e.g. memory 604) of the network device 102. The database 106 may be configured to store the sentence library 112, tagging rules 114, machine learning models 110, training data 116, and/or any other suitable type of data. The database 106 may be configured to send data to the network device 102 and to store data for the network device 102.

Machine Learning Model Training Process

Figure 2:
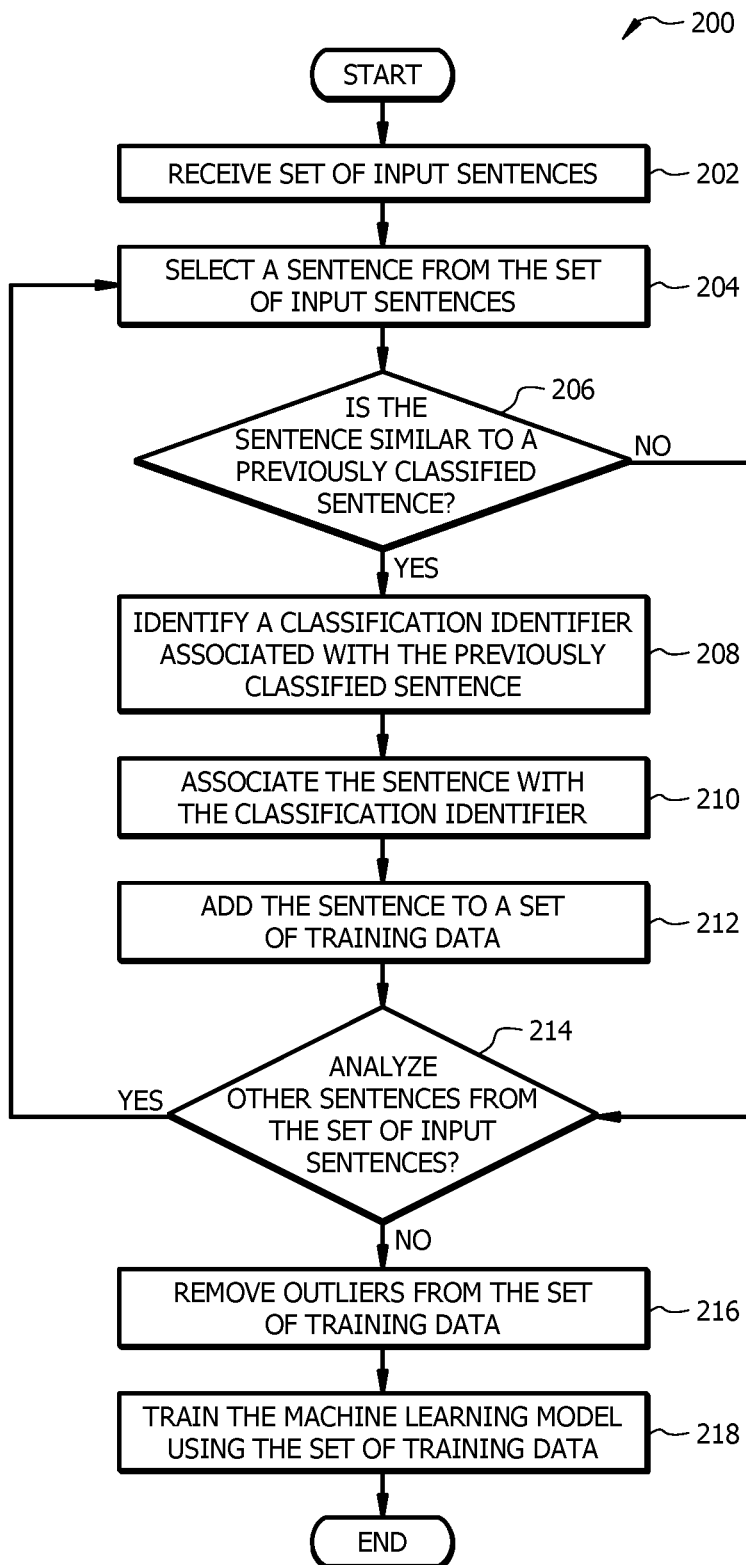
FIG. 2 is a flowchart of an embodiment of a machine learning model training method.

FIG. 2 is a flowchart of an embodiment of a machine learning model training method 200. Method 200 may be employed by the AI processing engine 108 of the network device 102 to prepare training data 116 for training a machine learning model 110. This process allows the AI processing engine 108 to create a set of training data 116 that improves accuracy when training machine learning models 110 by identifying similarities between sentences and/or by removing outliers from the training data 116.

At step 202, the AI processing engine 108 receives a set of input sentences 120. The set of input sentences 120 comprises a plurality of sentences that may be used for training a machine learning model 110. In one embodiment, the input sentences 120 may be provided by a user device 104. In another embodiment, the AI processing engine 108 may obtain the set of input sentences 120 from a memory (e.g. memory 604 or database 106). In another embodiment, the AI processing engine 108 may obtain the set of input sentences 120 by extracting the input sentences 120 from a document 118. For example, the AI processing engine 108 may be configured to receive a document 118 that comprises a text, to parse the document 118 using natural language processing, to identify the set of input sentences 120 from the text within the document 118, and to extract the input sentences 120 from the document 118. In other examples, the AI processing engine 108 may receive or obtain the set of input sentences 120 using any other suitable technique.

At step 204, the AI processing engine 108 selects a sentence from the set of input sentences 120. The AI processing engine 108 may iteratively select a sentence from the set of input sentences 120 to determine whether to include the selected sentence in a set of training data 116 for a machine learning model 110.

At step 206, the AI processing engine 108 determines whether the selected sentence is similar to a previously classified sentence. For example, the AI processing engine 108 may compare the selected sentence to previously classified sentences stored in the sentence library 112. In one embodiment, the AI processing engine 108 may perform a process similar to the process described in FIG. 3 for determining whether the selected sentence is similar to another sentence. For example, the AI processing engine 108 compute sentence vectors for the selected sentence and the previously classified sentences in the sentence library 112. A sentence vector is a numerical value that is uniquely associated with a sentence. In one embodiment, a sentence vector comprises a set of numeric values that correspond with a location in a vector space.

The AI processing engine 108 may then compute similarity scores between a sentence vector for the selected sentence and sentence vectors for the previously classified sentences in the sentence library 112 based on a cosine similarity value between sentence vectors. In this example, the cosine similarity value is a numeric value that represents an angle between sentence vectors and that corresponds with a similarity score. A similarity score is a numeric value that indicates how similar a pair of sentences are to each other. In one embodiment, the AI processing engine 108 may compute the similarity score by diving a dot product of a first sentence vector and a second sentence vector by a dot product of a magnitude of the first sentence vector and a magnitude of the second sentence vector.

The AI processing engine 108 may then determine whether any of the computed similarity scores are greater than or equal to a similarity score threshold value. The similarity score threshold value indicates a minimum similarity score for a pair of sentences to be considered similar to each other. When a similarity score is greater than or equal to the similarity score threshold value, the AI processing engine 108 may determine that the selected sentence is similar to a previously classified sentence in the sentence library 112. The AI processing engine 108 proceeds to step 214 in response to determining that the selected sentence is not similar to a previously classified sentence in the sentence library 112. Otherwise, the AI processing engine 108 proceeds to step 208 in response to determining that the sentence is similar to a previously classified sentence in the sentence library 112.

At step 208, the AI processing engine 108 identifies a classification identifier 113 associated with the previously classified sentence. For example, the AI processing engine 108 may identify a classification identifier 113 that is an alpha numeric identifier associated with a sentence. The classification identifier may uniquely identify a particular classification type for the sentence.

At step 210, the AI processing engine 108 associates the selected sentence with the identified classification identifier 113. The AI processing engine 108 may store an association between the selected sentence, the identified classification identifier 113, and the sentence type that corresponds with the classification identifier 113. For example, the AI processing engine 108 may store information linking the selected sentence, the classification identifier 113, and the sentence type in the sentence library 112.

At step 212, the AI processing engine 108 adds the selected sentence to a set of training data 116. For example, the AI processing engine 108 may add the selected sentence to a set of training sentences for a machine learning model 110. Adding the selected sentence to the set of training data 116 allows the selected sentence and its associated classification identifier 113 and sentence type to be used for training a machine learning model 110.

At step 214, the AI processing engine 108 determines whether to analyze another sentence from the set of input sentences 120. For example, the AI processing engine 108 may determine whether all of the sentences from the set of input sentences 120 have been processed for determining whether to add other sentences to the set of training data 116. The AI processing engine 108 may determine to analyze additional sentences from the set of input sentences 120 when one or more input sentences 120 have not been processed. The AI processing engine 108 returns to step 204 in response to a determining to analyze additional sentences from the set of input sentences 120. Here, the AI processing engine 108 returns to step 204 to select another sentence from the set of input sentences 120 for processing. Otherwise, the AI processing engine 108 proceeds to step 216 in response to determining not to analyze additional sentences from the set of input sentences 120.

At step 216, the AI processing engine 108 removes any outlier sentences from the set of training data 116. In one embodiment, the AI processing engine 108 may perform a process similar to the process described in FIG. 4 for removing outlier sentences from a set of training data 116. For example, the AI processing engine 108 may compare the sentences from the set of training data 116 amongst each other to determine whether the sentences are similar to each other based on similarity scores between the sentences. The AI processing engine 108 may compute similarity scores using a process similar to the process described in FIG. 3.

For each sentence, the AI processing engine 108 may count the number of similarity scores between a sentence and other sentences in the set of training data 116 that exceeds a similarity score threshold value. Here, the count indicates how many sentences that a sentence is similar to from the set of training data 116. The AI processing engine 108 may then compare the count to a set outlier threshold value and remove any sentences from the set of training data 116 with a count that is less than the set outlier threshold value. The set outlier threshold value indicates a minimum set count value to not be considered an outlier. When the count is less than the set outlier threshold value, this indicates that the sentence is only similar to a few sentences in the set of training data 116 and may be an outlier for the set of training data 116. When the count is greater than or equal to the set outlier threshold value, this indicates that the sentence is similar to a suitable number of sentences in the set of training data 116 and may not be an outlier for the set of training data 116.

At step 218, the AI processing engine 108 trains the machine learning model 110 using the set of training data 116. The AI processing engine 108 may use any suitable technique for training the machine learning model 110 using the set of training data 116 as would be appreciated by one of ordinary skill in the art.

In one embodiment, the AI processing engine 108 first generates a word-embedding model 110 and then uses the first word-embedding machine learning model 110 to train a second sentence classification machine learning model 110. The AI processing engine 108 may begin by cleaning the sentences in the set of training data 116. Cleaning the sentences in the training data 116 may comprise removing one or more words (e.g. "the" and "a"), converting text to lowercase, replacing numerals with text, ignoring words that are too short in length, or performing any other suitable type of cleaning technique. The AI processing engine 108 may then tokenize each word in training data 116 and add the tokenized words to a word dictionary. The word dictionary is a collection of words that are used for training machine learning models 110. Tokenizing the words of the training data 116 may compromise converting the text words into numeric vectors. For example, the AI processing engine 108 may use one-hot encoding, word2vec, or any other suitable technique for converting text into numeric vectors as would be appreciated by one of ordinary skill in the art. A numeric vector comprises a set of numeric values that correspond with a location in a vector space.

The AI processing engine 108 may then use the word vectors to train the first machine learning model 110 for word-embedding. The AI processing engine 108 may initialize weight parameters for the first machine learning model 110 using normally distributed random values. In one embodiment, the AI processing engine 108 may generate the normally distributed random values based on the total vocabulary size of the testing data 116 and/or the total vocabulary size of the word dictionary. The AI processing engine 108 may also initialize bias parameters for the first machine learning model 110 by using an array of zeros with a length that is equal to the number of words in the word dictionary.

The AI processing engine 108 may then perform a noise contrastive estimation (NCE) over the word dictionary.

Performing an NCE over the word dictionary may comprise performing a non-linear regression, for example using a model log-density function, to discriminate between words from the word dictionary and artificially generated noise. The AI processing engine 108 may compute a mean loss based on the results of the NCE to generate an objective function. Once the NCE and the objective function have been determined, the AI processing engine 108 may perform a regression (e.g. non-linear regression) to determine weights for a second machine learning model 110 for classifying sentences. The AI processing engine 108 may store the determined weights in memory (e.g. memory 604).

The AI processing engine 108 may create or configure the second machine learning model 110 for classifying sentences using information that was derived from the first machine learning model 110s. The second machine learning model 110 may comprise an input layer, one or more hidden layers, and an output layer. In one embodiment, the AI processing engine 108 configures the second machine learning model 110 to use the objective function, weights, and biases that were previously determined by the first machine learning model 110. The AI processing engine 108 may further configure the second machine learning model 110 to use a rectified linear unit function as an activation function and/or to use binary cross entropy loss minimization. In other embodiments, the AI processing engine 108 may configure the second machine learning model 110 to use any other suitable functions. The AI processing engine 108 may complete training the second machine learning model 110 by performing one or more cycles of feed-forward and back propagation using the training data 116. After training the second machine learning model 110, the second machine learning model 110 may be used for classifying sentences. For example, the second machine learning model 110 may be used in a document analysis process that is similar to the process described in FIG. 5.

Sentence Similarity Analysis Process

Figure 3:
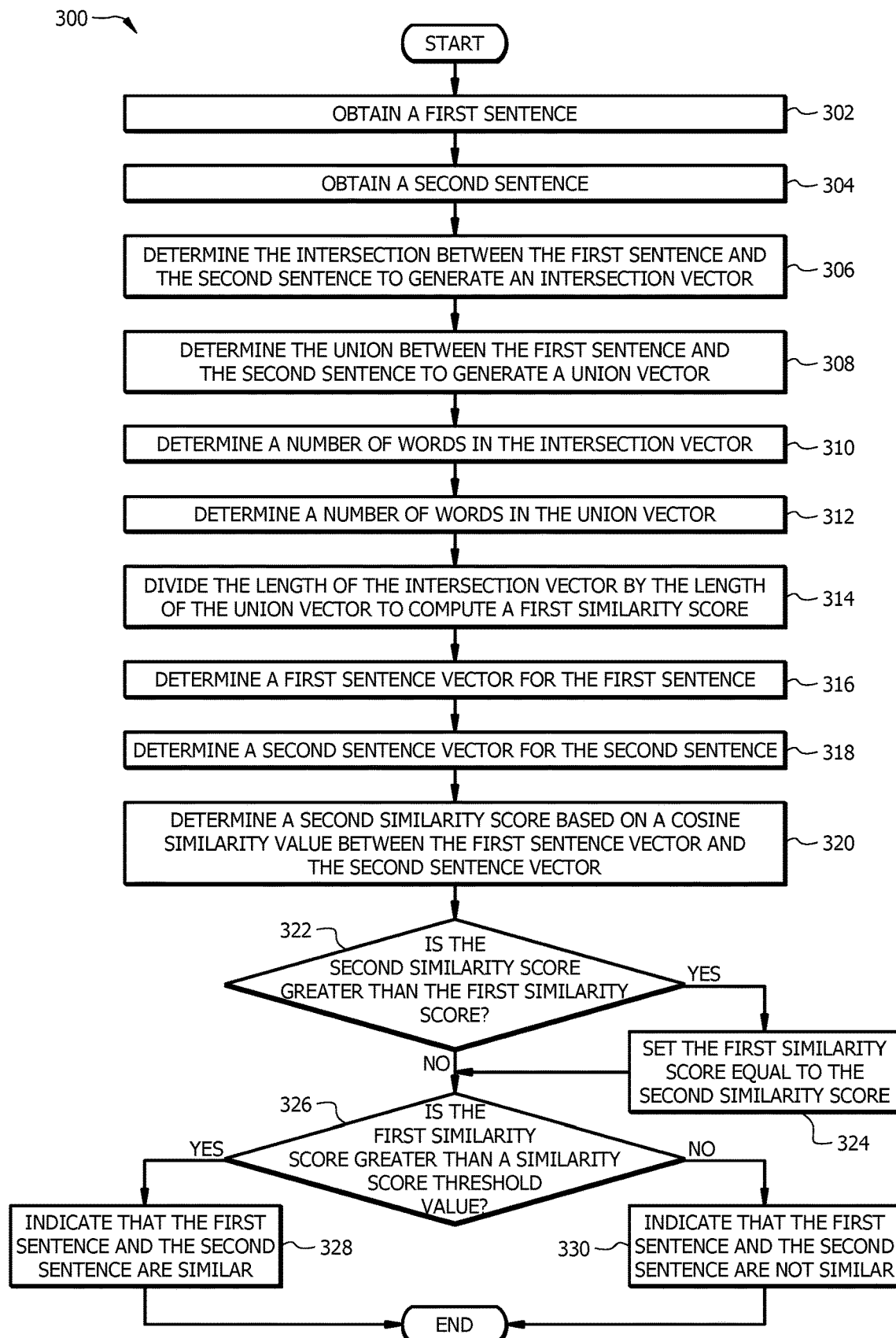
FIG. 3 is a flowchart of an embodiment of a sentence similarity analysis method.

FIG. 3 is a flowchart of an embodiment of a sentence similarity analysis method 300. Method 300 may be employed by the AI processing engine 108 of the network device 102 to determine whether a pair of sentences are similar to each other.

At step 302, the AI processing engine 108 obtains a first sentence. For example, the AI processing engine 108 may obtain the first sentence from a set of input sentences 120 that are being processed for a set of training data 116. As another example, the AI processing engine 108 may obtain the first sentence by receiving a document 118 that comprises a plurality of sentences and selecting a sentence from among the sentences in the document 118. In other examples, the AI processing engine 108 may obtain the first sentence from any other suitable source.

At step 304, the AI processing engine 108 obtains a second sentence. For example, the second sentence may be a previously classified sentence from the sentence library 112. The AI processing engine 108 may be configured to iteratively select sentences from the sentence library 112 to compare to the first sentence. In this example, the second sentence has been previously classified and is associated with a classification identifier 113. In other examples, the second sentence may be a sentence that is not already associated with a classification identifier 113. For instance, the second sentence may be another sentence within the document 118 where the first sentence was obtained from. In other examples, the AI processing engine 108 may obtain the second sentence from any other suitable source.

At step 306, the AI processing engine 108 determines an intersection between the first sentence and the second sentence to generate an intersection vector. The intersection vector may be implemented as a data array, a data vector, a data table, or any other suitable type of data structure. The intersection vector comprises a set of words that are common between the first sentence and the second sentence. Here, the AI processing engine 108 identifies any common words between the first sentence and the second sentence and stores the common words in an intersection vector. For example, the first sentence may state "the small brown dog ran into the woods" and the second sentence may state "big brown bears typically live in the woods." In this example, the AI processing engine 108 may generate an intersection vector that comprises the words "the," "brown," and "woods."

At step 308, the AI processing engine 108 determines a union between the first sentence and the second sentence to generate a union vector. The union vector may be implemented as a data array, a data vector, a data table, or any other suitable type of data structure. The union vector comprises a set of words that are unique among the first sentence and the second sentence. Here, the AI processing engine 108 identifies instances of words that appear in either the first sentence or the second sentence and stores the identified words in a union vector. Continuing with the previous example, the AI processing engine 108 may generate a union vector that comprises the words "the," "small," "brown," "dog," "ran," "into," "woods," "big," "bears," "typically," "live," and "in."

At step 310, the AI processing engine 108 determines the number of words in the intersection vector. For instance, the AI processing engine 108 may count the number of words in the intersection vector. Continuing with the previous example, the AI processing engine 108 may determine that the intersection vector comprises three words (i.e. "the," "brown," and "woods").

At step 312, the AI processing engine 108 determines the number of words in the union vector. For instance, the AI processing engine 108 may count the number of words in the union vector. Continuing with the previous example, the AI processing engine 108 may determine that the union vector comprises twelve words (i.e. "the," "small," "brown," "dog," "ran," "into," "woods," "big," "bears," "typically," "live," and "in").

At step 314, the AI processing engine 108 computes a first similarity score by dividing the number of words in the intersection vector by the number of words in the union vector. Continuing with the previous example, the AI processing engine 108 may determine that the first similarity score is equal to three divided twelve which is 0.25. The first similarity score is a numeric value that indicates how similar the first sentence and the second sentence are to each other based on the words within the first sentence and the second sentence.

At step 316, the AI processing engine 108 determines a first sentence vector for the first sentence. The first sentence vector is a numeric value that uniquely represents the first sentence. For example, the first sentence vector may comprise a first set of numeric values that correspond with a first location in a vector space. The AI processing engine 108 may use word2vec, doc2vec, or any other suitable technique for converting text into vectors as would be appreciated by one of ordinary skill in the art.

At step 318, the AI processing engine 108 determines a second sentence vector for the second sentence. The second sentence vector is a numeric value that uniquely represent the second sentence. For example, the second sentence vector may comprise a second set of numeric values that correspond with a second location in the vector space. The AI processing engine 108 may determine a second sentence vector using a process similar to the process described in step 316.

At step 320, the AI processing engine 108 determines a cosine similarity value between the first sentence vector and the second sentence vector to generate a second similarity score. The cosine similarity value is a numeric value that corresponds with a second similarity score between the first sentence and the second sentence. In other words, the second similarity score is equal to the cosine similarity value. The second similarity score is another numeric value that indicates how similar the first sentence and the second sentence are to each other In one embodiment, the cosine similarity value may be computed by dividing a dot product of the first sentence vector and the second sentence vector by a dot product of a magnitude of the first sentence vector and a magnitude of the second sentence vector. In this example, the similarity score may have a value between zero and one. In other examples, the AI processing engine 108 may determine the cosine similarity value between the first sentence vector and the second sentence vector using any suitable technique. For example, the cosine similarity value may correspond with an angle between the first sentence vector and the second sentence vector. The cosine similarity value may be equal to one when the first sentence vector and the second sentence vector are the same as each other. The cosine similarity value may be equal to zero when the first sentence vector and the second sentence vector are very difference from each other.

At step 322, the AI processing engine 108 determines if the second similarity score is greater than the first similarity score. Here, the AI processing engine 108 compares the second similarity score, which is based on sentence vectors, to the first similarity score, which is based on the intersection and union of words in the first and second sentences, to determine which similarity score is greater. The AI processing engine 108 may use the greater of the two similarity scores for determining whether the first sentence and the second sentence are similar to each other. The AI processing engine 108 proceeds to step 324 in response to determining that the second similarity score is greater than the first similarity score.

At step 324, the AI processing engine 108 sets the first similarity score to equal the second similarity score in response to determining that the second similarity score is greater than the first similarity score. Setting the first similarity score to the equal the second similarity score allows the first similarity score to be used for determining whether the first sentence and the second sentence are similar to each other. The AI processing engine 108 may keep the larger of the two similarity scores and discard or ignore the other similarity score.

Returning to step 322, the AI processing engine 108 proceeds to step 326 in response to determining that the second similarity score is less than the first similarity score. At step 326, the AI processing engine 108 determines if the first similarity score is greater than or equal to a similarity score threshold value. The similarity score threshold value indicates a minimum similarity score for the first sentence and the second sentence to be considered similar to each other. The similarity score threshold value may be any predetermined value for determining whether a pair of sentences are similar to each other. For example, the similarity score threshold value may be set to a value of 0.1, 0.25, 0.5, 0.7, or any other suitable value.

The AI processing engine 108 proceeds to step 328 in response to determining that the first similarity score is greater than or equal to the similarity score threshold value. At step 328, the AI processing engine 108 indicates that the first sentence is similar to the second sentence based on their similarity score. In one embodiment, the AI processing engine 108 may indicate that the first sentence and the second sentence are similar to each other by associating the first sentence and the second sentence with the same classification identifier 113 and sentence type. For example, the AI processing engine 108 may determine a classification identifier 113 and sentence type that are associated with the second sentence and may associate the first sentence with the same classification identifier 113 and sentence type. In another embodiment, the AI processing engine 108 may be configured to output an alphanumeric value that indicates that the first sentence and the second sentence are similar to each other. For example, the AI processing engine 108 may output a binary value of one that indicates the first sentence and the second sentence are similar to each other. In other embodiments, the AI processing engine 108 may indicate that the first sentence and the second sentence are similar to each other using any other suitable technique.

Returning to step 326, the AI processing engine 108 proceeds to step 330 in response to determining that the first similarity score is less than the similarity score threshold value. At step 330, the AI processing engine 108 indicates that the first sentence is not similar to the second sentence based on their similarity score. In one embodiment, the AI processing engine 108 may be configured to output an alphanumeric value that indicates that the first sentence and the second sentence are not similar to each other. For example, the AI processing engine 108 may output a binary value of zero that indicates the first sentence and the second sentence are not similar to each other. In other embodiments, the AI processing engine 108 may indicate that the first sentence and the second sentence are not similar to each other using any other suitable technique.

Sentence Outlier Detection Process

Figure 4:
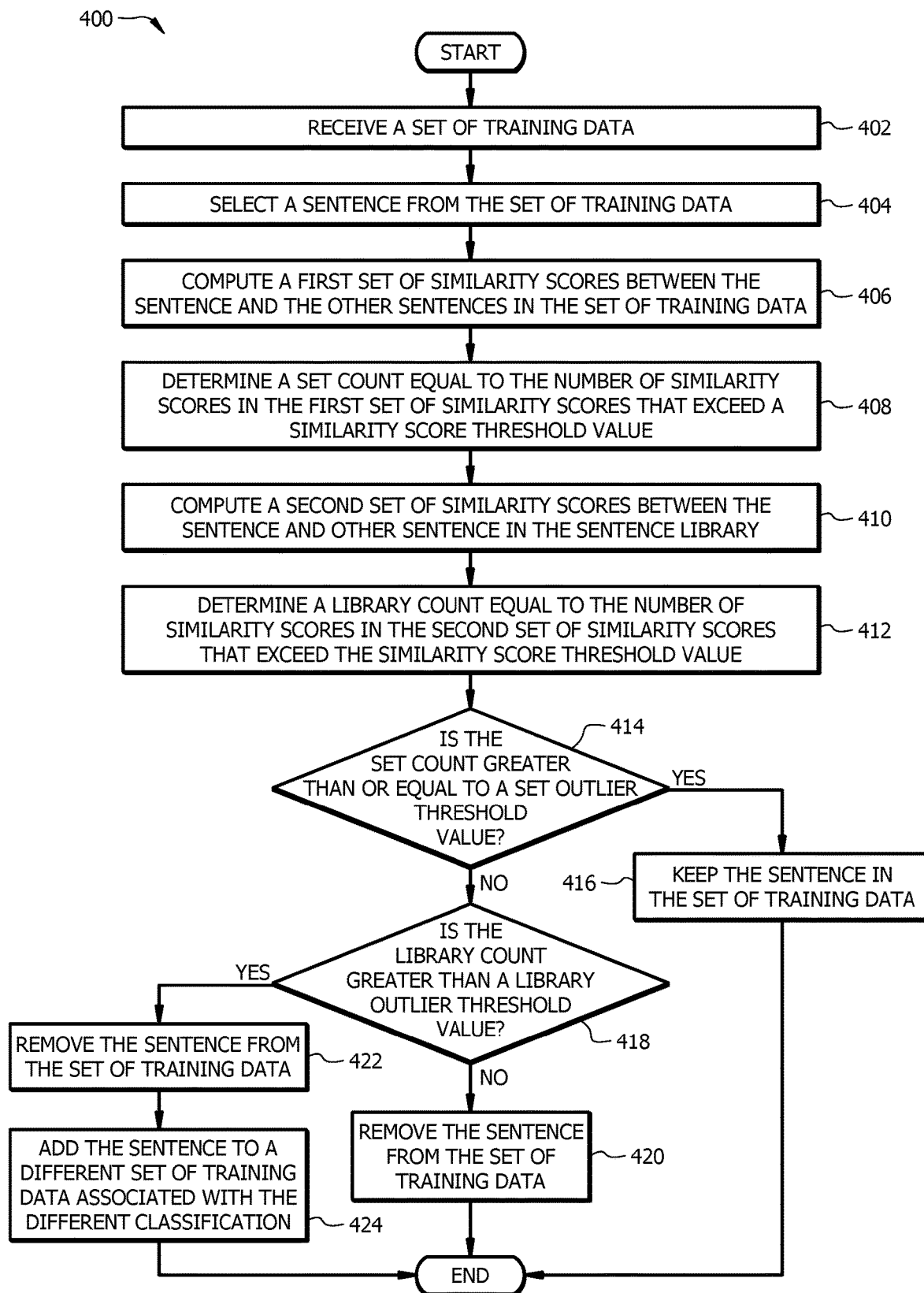
FIG. 4 is a flowchart of an embodiment of a sentence outlier detection method.

FIG. 4 is a flowchart of an embodiment of a sentence outlier detection method 400. Method 400 may be employed by the AI processing engine 108 of the network device 102 to determine whether a sentence within a set of training data 116 is an outlier. This process allows the AI processing engine 108 to remove sentences that would degrade the accuracy or performance of a set of training data 116 for training a machine learning model 110.

At step 402, the AI processing engine 108 receives a set of training data 116. The training data 116 comprises a set of sentences that are each associated with a classification identifier 113. For example, the AI processing engine 108 receive the set of training data 116 as part of training process for a machine learning model 110 similar to the process described in FIG. 2. As another example, the AI processing engine 108 may obtain the set of training data 116 from a memory (e.g. memory 604 or database 106).

At step 404, the AI processing engine 108 selects a sentence from the set of training data 116. For example, the AI processing engine 108 may be configured to iteratively select sentences from the set of training data 116 for testing whether the selected sentence is an outlier.

At step 406, the AI processing engine 108 computes a first set of similarity scores between the selected sentence and other sentences in the set of training data 116. In one embodiment, the AI processing engine 108 may compute the first set of similarity scores using a process similar to the process described in FIG. 3. For example, the AI processing engine 108 may determine a number of common words between the selected sentence and another sentence from the set of training data 116. The AI processing engine 108 may also determine a number of unique words from among the selected sentence and the other sentence from the set of training data 116. The AI processing engine 108 may then determine a similarity score based on a ratio between the number of common words and the number of unique words between the selected sentence and the other sentence from the set of training data 116.

As another example, the AI processing engine 108 may convert the selected sentence into a first sentence vector and may convert another sentence from the set of training data 116 into a second sentence vector using a process similar to the process described in steps 316 and 318 of FIG. 3. The AI processing engine 108 may then determine a similarity score between the first sentence vector and the second sentence vector by dividing a dot product of the first sentence vector and the second sentence vector by a dot product of a magnitude of the first sentence vector and a magnitude of the second sentence vector. In other examples, AI processing engine 108 may compute the set of similarity scores using any other suitable technique.

At step 408, the AI processing engine 108 determines a set count that is equal to the number of similarity scores in the first set of similarity scores that exceed a similarity score threshold value. The similarity score threshold value is a numeric value that indicates a minimum similarity score for a pair of sentences to be considered similar to each other. Here, the AI processing engine 108 counts the number of similarity scores from the first set of similarity scores that are greater the similarity score threshold value and stores the count value as the set count. The similarity score threshold value may be set to any suitable predetermined value.

At step 410, the AI processing engine 108 computes a second set of similarity scores between the selected sentence and previously classified sentences in the sentence library 112. The AI processing engine 108 may compute the second set of similarity scores using a process similar to the process described in step 406.

At step 412, the AI processing engine 108 determines a library count that is equal to the number of similarity scores in the second set of similarity scores that exceed the similarity score threshold value. Here, the AI processing engine 108 counts the number of similarity scores from the second set of similarity scores that are greater the similarity score threshold value and stores the count value as the library count. In some embodiments, the AI processing engine 108 may use a different similarity score threshold value for the library count and the set count.

At step 414, the AI processing engine 108 determines if the set count is greater than or equal to a set outlier threshold value. The set outlier threshold value indicates a minimum set count value to not be considered an outlier. In other words, the set outlier threshold value may be any suitable predetermined value that indicates a minimum number of sentences from the set of training data 116 that the selected sentence needs to be similar to in order to not be considered an outlier. When set count is greater than or equal to the set outlier threshold value, this indicates that the selected sentence is not an outlier because the selected sentence is similar to a suitable number of other sentences in the set of training data 116.

The AI processing engine 108 proceeds to step 416 in response to determining that set count is greater than or equal to the set outlier threshold value. At step 416, the AI processing engine 108 keeps the selected sentence in the set of training data 116 in response to determining that the selected sentence is not an outlier with respect to the set of training data 116.

Returning to step 414, the AI processing engine 108 proceeds to step 418 in response to determining that the set count is less than the set outlier threshold value. When set count is less than the set outlier threshold value, this indicates that the selected sentence is an outlier because the selected sentence is not similar to a suitable number of other sentences in the set of training data 116. At step 418, the AI processing engine 108 determines if the library count is greater than or equal to a library outlier threshold value. The library outlier threshold value indicates a minimum library count value to not be considered an outlier. In other words, the library outlier threshold value may be any suitable predetermined value that indicates a minimum number of sentences from the sentence library 112 that the selected sentence needs to be similar to in order to not be considered an outlier. When library count is greater than or equal to the library outlier threshold value, this indicates that the selected sentence is not an outlier because the selected sentence is similar to a suitable number of other sentences in the sentence library 112.

The AI processing engine 108 proceeds to step 420 in response to determining that the library count is less than the library count threshold value. When library count is less than the library outlier threshold value, this indicates that the selected sentence is an outlier because the selected sentence is not similar to a suitable number of other sentences in the sentence library 112. In this case, the AI processing engine 108 determines that the selected sentence is an outlier with respect to both the set of training data and the sentence library 112. At step 420, the AI processing engine 108 removes the selected sentence from the set of training data 116 in response to determining that the selected sentence is an outlier.

Returning to step 418, the AI processing engine 108 proceeds to step 422 in response to determining that the library count is greater than or equal to the library outlier threshold value. When library count is greater than or equal to the library outlier threshold value, this indicates that the selected sentence is not an outlier with respect to the sentence library 112 because the selected sentence is similar to a suitable number of sentences in the sentence library 112. In this case, the AI processing engine 108 determines that the selected sentence is an outlier with respect to the set of training data 116 but is not an outlier with respect to the sentence library 112. At step 422, the AI processing engine 108 removes the sentence from the set of training data 116. In one embodiment, the AI processing engine 108 may remove the selected sentence from the set of training data 116 by discarding the selected sentence. Removing the selected sentence from the set of training data 116 improves the quality of the set of training data 116 which improves accuracy when training a machine learning model 110.

At step 424, the AI processing engine 108 adds the selected sentence to a different set of training data 116 that is associated with a different classification identifier 113 and sentence type. After removing the selected sentence from the set of training data 116, the AI processing engine 108 may add the selected sentence to a different set of training data 116 that is more similar to the selected sentence. In this example, the AI processing engine 108 may add the selected sentence to a different set of training data 116 that is associated with a different classification identifier 113 and sentence type than the classification identifier 113 and sentence type that are associated with the set of training data 116 where selected sentence was removed from.

Document Analysis Process

Figure 5:
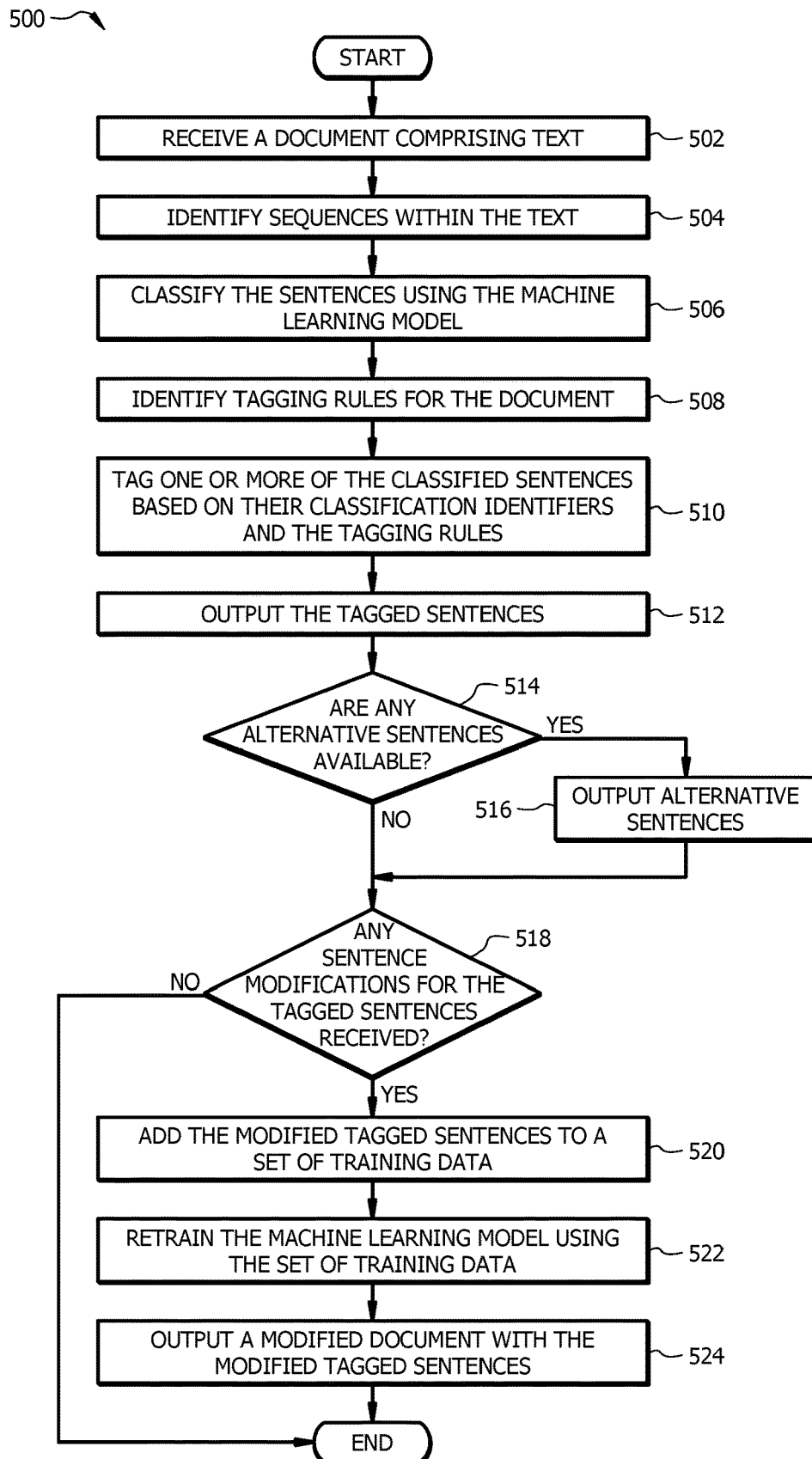
FIG. 5 is a flowchart of an embodiment of a document analysis method using machine learning.

FIG. 5 is a flowchart of an embodiment of a document analysis method 500 using machine learning. Method 500 may be employed by the AI processing engine 108 of the network device 102 to process a document 118 and to tag sentences in the document that are associated with tagging rules 114 for the document 118. For example, the AIT processing engine 108 may process a document 118 to determine whether the document 118 contains any restricted types of information. As another example, the AI processing engine 108 may process a document 118 to determine whether the document contains any speculative or predictive type sentences. For instance, a speculative type sentence may state "To make the takeover successful, the company needs to acquire a majority share by March 31$^{st}$ and obtain consent from the board of directors." As another example, the AI processing engine 108 may process a document 118 to determine whether the document 118 contains any definitive type sentences. For instance, a definitive type sentence may include words such as "will," "must," and "always." The AI processing engine 108 may employ method 500 to tag sentences so they can be modified and/or removed by a user. In other examples, the AI processing engine 108 may be configured to tag any other suitable types of sentences. In addition, the method 500 may be employed to retrain a machine learning model 110 based on modifications and feedback provided by a user in response to tagging one or more sentences.

At step 502, the AI processing engine 108 receives a document 118 that comprises text. Example of documents 118 include, but are not limited to, reports, presentations, legal documents, marketing documents, business documents, articles, press releases, or any other suitable type of documents. In one embodiment, the AI processing engine 108 receives the document 118 from a user device 104. For example, the AI processing engine 108 may receive the document 118 from a user device 104 as an attachment or as part of a file transfer process. In another embodiment, the AI processing engine 108 receives the document 118 from a memory (e.g. memory 604 or database 106).

At step 504, the AI processing engine 108 identifies sentences within the text of the document 118. In one embodiment, the AI processing engine 108 employs natural language processing to identify and/or extract sentences from within the text of the document 118. The AI processing engine 108 may be configured to use optical character recognition, text recognition, text parsing, text segmentation, and/or any other suitable type of natural language processing technique to identify and/or extract sentences the document 118.

At step 506, the AI processing engine 108 classifies the sentences using the machine learning model 110. The AI processing engine 108 inputs the identified sentences from the document 118 into a machine learning model 110 and receives classification identifiers 113 that are associated with each of the input sentences. Each classification identifier 113 identifies a sentence type for an input sentence.

At step 508, the AI processing engine 108 identifies tagging rules 114 for the document 118. The tagging rules 114 identify sentences that need to be tagged based on their associated classification identifier 113 and sentence type. For example, the tagging rules 114 may identify one or more classification identifiers 113 and/or sentence types for tagging. In one embodiment, the AI processing engine 108 is configured to identify a document type (e.g. press release) and a corresponding set of tagging rules 114 based on the identified document type. The AI processing engine 108 may determine the document type based on file format, content (e.g. text or images) within the document 118, or any other suitable characteristics of the document 118.

At step 510, the AI processing engine 108 tags or annotates one or more sentences based on their classification identifiers 113 and the tagging rules 114. For example, the AI processing engine 108 may identify the classification identifiers 113 and sentence types for the sentences in the document 118 that match the classification identifiers 113 and sentence types identified by the tagging rules 114. The AI processing engine 108 may then tag or annotate the identified sentences from the document 118.

At step 512, the AI processing engine 108 outputs the tagged sentences. In one embodiment, the AI processing engine 108 may output the tagged sentences by annotating the one or more identified sentences. Annotating a sentence may comprise changing a format of the sentence. For example, the AI processing engine 108 may highlight, bolden, underline, italicize, add comments, or perform any other suitable type of annotation operation on sentences within the document 118 to indicate tagged sentences. In one embodiment, the AI processing engine 108 may provide or annotate the tagged sentences with their corresponding classification identifier 113. In this case, the AI processing engine 108 identifies both the tagged sentence and its classification identifier 113 which may indicate a reason why the sentence was tagged. For example, a sentence may be bolden within the document and annotated with a classification identifier 113 that indicates that the sentence is a definitive type of sentence. In some examples, sentence annotations may be in line or overlaid with the document 118.

In another embodiment, the AI processing engine 108 may output the tagged sentences by extracting or copying sentences from the document and providing the tagged sentences in a separate application window. For example, the AI processing engine 108 may display the text from the document 118 in a first application window and may display the tagged sentences in a second application window that is different from the first application window. In other examples, the AI processing engine 108 may output or identify the tagged sentences using any other suitable technique.

At step 514, the AI processing engine 108 determines whether any alternative sentences are available. In one embodiment, the AI processing engine 108 may compute similarity scores between a tagged sentence and other sentences in the sentence library 112. For example, the AI processing engine 108 may compute similarity scores using a process similar to the process described in FIG. 2. The AI processing engine 108 may identify one or more sentences from the sentence library 112 that correspond with a similarity score that exceeds a predetermined similarity score threshold value. Here, the similarity score threshold value indicates a minimum similarity score for a pair of sentences to be considered alternatives of each other. As an example, the predetermined similarity score threshold value may be equal to 0.71. In other examples, the predetermined similarity score threshold value may be equal to any other suitable value. The AI process engine 108 may identify the classification identifiers 113 and sentence types for the identified alternative sentences to ensure that the classification identifiers 113 and sentence types are different from the classification identifiers 113 and sentence types that are identified by the tagging rules 114. In other words, the AI processing engine 108 checks the identified alternative sentences to ensure that none of the sentences would trigger being tagged by the tagging rules 114. The AI processing engine 108 may remove any sentences from the set of identified alternative sentences that are associated with a classification identifier 113 and sentence type that is identified by the tagging rules 114. This means that the resulting alternative sentences will each be associated with a classification identifier 113 and sentence type that are different from the classification identifier 113 and sentence type of a tagged sentence.

The AI processing engine 108 proceeds to step 516 in response to determining that alternative sentences are available. At step 516, the AI processing engine 108 outputs the alternative sentences. In one embodiment, the AI processing engine 108 may output the alternative sentences by providing the alternative sentences in a separate application window. For example, the AI processing engine 108 may display the text from the document 118 in a first application window and may display the alternative sentences in a second application window that is different from the first application window. In other examples, the AI processing engine 108 may output or identify the alternative sentences using any other suitable technique.

Returning to step 514, the AI processing engine 108 proceeds to step 518 in response to determining that there are not alternative sentences available. At step 518, the AI processing engine 108 determines if any sentence modifications for tagged sentences were received. For example, the AI processing engine 108 may determine whether any of the text has changed for any of the tagged sentences. For instance, the AI processing engine 108 may determine whether a user has added words, deleted words, or altered a tagged sentence. As another example, the AI processing engine 108 may determine whether the user has indicated to replace one of the tagged sentences with one of the provided alternative sentences. In other examples, the AI processing engine 108 may determine whether the tagged sentences have been modified using any other suitable technique. The AI processing engine 108 terminates method 500 in response to determining that the no sentence modifications were received. In this case, the AI processing engine 108 does not have any modified sentences or feedback from the user that can be used to retrain the machine learning model 110.

Otherwise, the AI processing engine 108 proceeds to step 520 in response to determining that one or more sentence modifications were received. In this case, the AI processing engine 108 may use the modifications to the tagged sentences as feedback for retraining the machine learning model 110. At step 520, the AI processing engine 108 adds the modified tagged sentences to a set of training data 116. Here, the AI processing engine 108 updates the set of training data 116 to include the modified tagged sentences so that the machine learning model 110 can be retrained based on the modifications and feedback provided by the user. This process allows the AI processing engine 108 to improve the accuracy of the machine learning model 110 by using feedback and information provided by the user.

At step 522, the AI processing engine 108 retrains the machine learning model 110 using the updated set of training data 116. For example, the AI processing training engine 108 may retrain the machine learning model 110 using a process similar to the process described in step 218 of FIG. 2.

At step 524, the AI processing engine 108 outputs a modified document 122 with the modified tagged sentences. Here, the AI processing engine 108 may generate and output a modified copy of the original document 118 that includes the modified tagged sentence. The AI processing engine 108 may output the modified document 122 in the same format as the original received document. In other examples, the AI processing engine 108 may be configured to output the modified document 122 in a different format that the original document. For instance, a user may specify a particular format for outputting the modified document 122. In some embodiments, the AI processing engine 108 may output the modified document 122 before retraining the machine learning model 110 or in parallel with retraining the machine learning model 110. In one embodiment, the AI processing engine 108 may output the modified document 122 to another device (e.g. user device 104, network device 102, or database 106). For example, the AI processing engine 108 may transmit the modified document 122 to another user device 104.

Network Device Hardware Configuration

Figure 6:
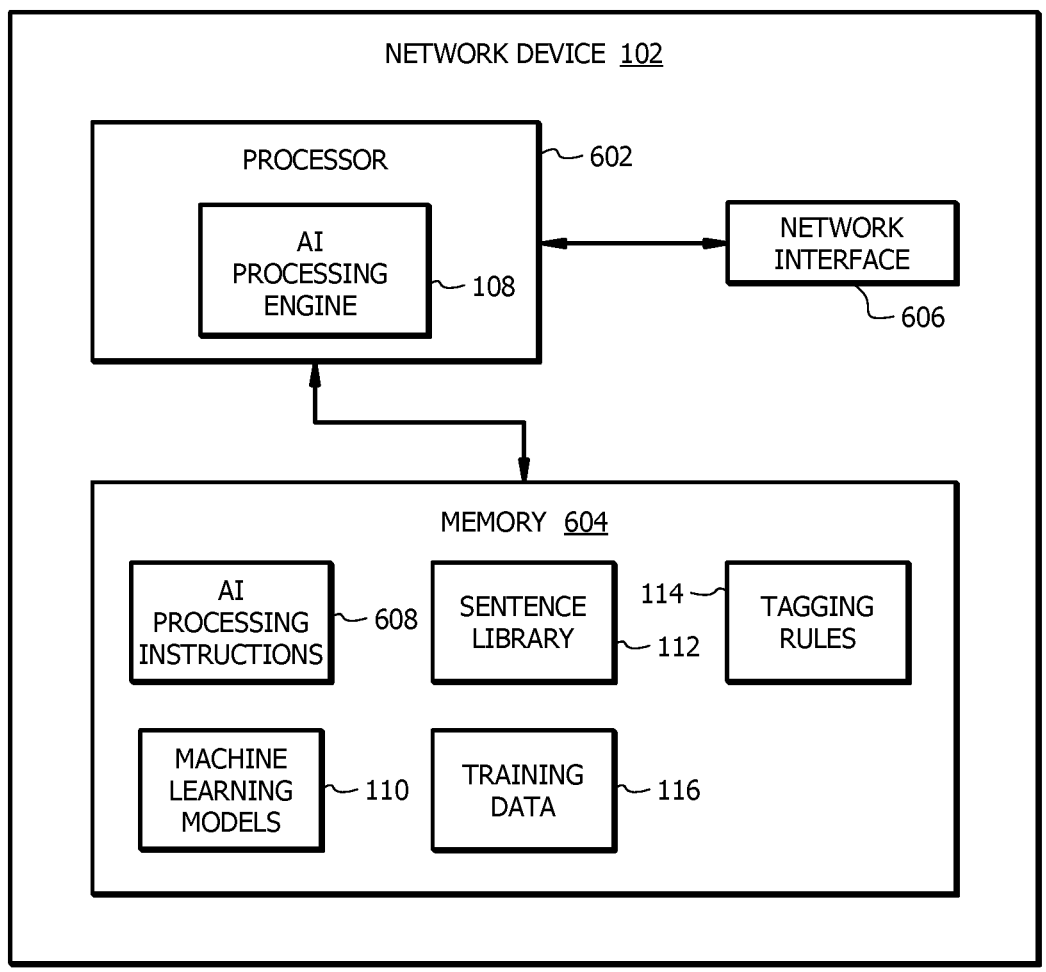
FIG. 6 is an embodiment of a device configured to analyze documents using machine learning.

FIG. 6 is an embodiment of a device (e.g. network device 102) configured to analyze documents using machine learning. The network device 102 comprises a processor 602, a memory 604, and a network interface 606. The network device 102 may be configured as shown or in any other suitable configuration.

The processor 602 comprises one or more processors operably coupled to the memory 604. The processor 602 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 602 may be a programmable logic device, a microcontroller, a microprocessor, or any suitable combination of the preceding. The processor 602 is communicatively coupled to and in signal communication with the memory 604. The one or more processors are configured to process data and may be implemented in hardware or software. For example, the processor 602 may be 8-bit, 16-bit, 32-bit, 64-bit or of any other suitable architecture. The processor 602 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement an AI processing engine 108. In this way, processor 602 may be a special purpose computer designed to implement the functions disclosed herein. In an embodiment, the AI processing engine 108 is implemented using logic units, FPGAs, ASICs, DSPs, or any other suitable hardware. The AI processing engine 108 is configured operate as described in FIGS. 1-5. For example, the AI processing engine 108 may be configured to perform the steps of methods 200, 300, 400, and 500 described in FIGS. 2, 3, 4, and 5, respectively. In some embodiments, the AI processing engine 108 may be configured to combine steps from any of the methods 200, 300, 400, and 500 described in FIGS. 2, 3, 4, and 5, respectively.

The memory 604 comprises one or more disks, tape drives, or solid-state drives, and may be used as an over-flow data storage device, to store programs when such programs are selected for execution, and to store instructions and data that are read during program execution. The memory 604 may be volatile or non-volatile and may comprise read-only memory (ROM), random-access memory (RAM), ternary content-addressable memory (TCAM), dynamic random-access memory (DRAM), and static random-access memory (SRAM).

The memory 604 is operable to store AI processing instructions 608, machine learning models 110, a sentence library 112, training data 116, tagging rules 114, and/or any other data or instructions. The AI processing instructions 608 may comprise any suitable set of instructions, logic, rules, or code operable to execute the AI processing engine 108. The machine learning models 110, the sentence library 112, the tagging rules 114, and training data 116 are configured similar to the machine learning models 110, the sentence library 112, the tagging rules 114, and the training data 116 described in FIG. 1, respectively.

The network interface 606 is configured to enable wired and/or wireless communications. The network interface 606 is configured to communicate data between the network device 102 and other devices (e.g. user devices 104 and/or databases 106), systems, or domain. For example, the network interface 606 may comprise a WIFI interface, a LAN interface, a WAN interface, a modem, a switch, or a router. The processor 602 is configured to send and receive data using the network interface 606. The network interface 606 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A document analysis device, comprising:
a memory operable to store:
a machine learning model configured to:
receive a sentence as an input; and
output a classification identifier for the received sentence, wherein the classification identifier identifies a sentence type; and
a plurality of previously classified sentences, wherein:
each sentence from the plurality of previously classified sentences is associated with the classification identifier that identifies a sentence type;
the plurality of previously classified sentences are classified based at least in part upon a plurality of sentence types comprising at least two of a factual sentence type, a predictive sentence type, or a classified information sentence type, and
an artificial intelligence (AI) processing engine implemented by a processor operably coupled to the memory, configured to:
receive a set of input sentences;
select a first sentence from the set of input sentences;
compare the first sentence to the plurality of previously classified sentences;
compute similarity scores between the first sentence and the plurality of previously classified sentences, wherein a similarity score is a numeric value that indicates how similar a pair of sentences are to each other based on the text within the pair of sentences;
identify a second sentence from the plurality of previously classified sentences that is associated with a similarity score greater than or equal to a similarity score threshold value, wherein the similarity score threshold value indicates a minimum similarity score for a pair of sentences to be considered similar to each other;
identify a sentence type for the second sentence based on a classification identifier that is linked with the second sentence, wherein the sentence type identifies a type of grammatical structure for the second sentence;
associate the first sentence with the identified sentence type for the second sentence;
add the first sentence with the identified sentence type to a set of training sentences for the machine learning model, wherein the set of training sentences is associated with the classification identifier;
for each sentence in the set of training sentences, determine a count of similarity scores between each sentence and other sentences in the set of training sentences that exceeds the similarity score threshold value;
for a given sentence in the set of training sentences, compare the count of similarity scores to an outlier threshold value, wherein the outlier threshold value indicates a minimum count value that indicates a minimum number of sentences from the set of training sentences to which the given sentence needs to be similar in order to not be considered an outlier;
remove one or more sentences from the set of training sentences that are associated with a count of similarity scores that is less than the outlier threshold value; and
train the machine learning model using the set of training sentences.

2. The device of claim 1, wherein computing the similarity score comprises:
convert the first sentence into a first vector that comprises a first set of numeric values that correspond with a first location in a vector space;
convert a second sentence from the plurality of previously classified sentences into a second vector that comprises a second set of numeric values that correspond with a second location in the vector space; and computing the similarity score by dividing a dot product of the first vector and the second vector by a dot product of a magnitude of the first vector and a magnitude of the second vector.

3. The device of claim 1, wherein computing the similarity score comprises:
identifying common words between the first sentence and the second sentence;
store the identified common words in a first data structure;
store each unique word from the first sentence and the second sentence in a second data structure;
determine a number of words in the first data structure;
determine a number of words in the second data structure;
compute the similarity score by dividing the number of words in the first data structure by the number of words in the second data structure.

4. The device of claim 1, wherein the machine learning model is configured to classify an input sentence based at least in part on verb tenses used in the input sentence.

5. The device of claim 1, wherein the machine learning model is configured to classify an input sentence based at least in part on a grammatical structure of the input sentence.

6. The device of claim 1, wherein receiving the set of input sentences comprises:
receiving a document comprising text;
parsing the document to identify the set of input sentences; and
extracting the set of input sentences from the document.

7. A machine learning model training method, comprising:
receiving a set of input sentences;
selecting a first sentence from the set of input sentences;
comparing the first sentence to a plurality of previously classified sentences, wherein
 each sentence from the plurality of previously classified sentences is associated with a classification identifier that identifies a sentence type; and
 the plurality of previously classified sentences are classified based at least in part upon a plurality of sentence types comprising at least two of a factual sentence type, a predictive sentence type, or a classified information sentence type, and
computing similarity scores between the first sentence and the plurality of previously classified sentences, wherein a similarity score is a numeric value that indicates how similar a pair of sentences are to each other based on the text within the pair of sentences;
identifying a second sentence from the plurality of previously classified sentences with a similarity score greater than or equal to a similarity score threshold value, wherein the similarity score threshold value indicates a minimum similarity score for a pair of sentences to be considered similar to each other;
identifying a sentence type for the second sentence based on a classification identifier that is linked with the second sentence, wherein the sentence type identifies a type of grammatical structure for the second sentence;
associating the first sentence with the identified sentence type for the second sentence;
adding the first sentence with the identified sentence type to a set of training sentences for a machine learning model, wherein:
 the machine learning model configured to:
  receive a sentence as an input; and
  output a classification identifier for the received sentence that indicates a sentence type;
 the set of training sentences is associated with the classification identifier;
for each sentence in the set of training sentences, determining a count of similarity scores between each sentence and other sentences in the set of training sentences that exceeds the similarity score threshold value;
for a given sentence in the set of training sentences, comparing the count of similarity scores to an outlier threshold value, wherein the outlier threshold value indicates a minimum count value that indicates a minimum number of sentences from the set of training sentences to which the given sentence needs to be similar in order to not be considered an outlier;
removing one or more sentences from the set of training sentences that are associated with a count of similarity scores that is less than the outlier threshold value; and
training the machine learning model using the set of training sentences.

8. The method of claim 7, wherein computing the similarity score comprises:
converting the first sentence into a first vector that comprises a first set of numeric values that correspond with a first location in a vector space;
converting the second sentence into a second vector that comprises a second set of numeric values that correspond with a second location in the vector space; and
computing the similarity score by dividing a dot product of the first vector and the second vector by a dot product of a magnitude of the first vector and a magnitude of the second vector.

9. The method of claim 7, wherein computing the similarity score comprises:
identifying common words between the first sentence and the second sentence;
store the identified common words in a first data structure;
store each unique word from the first sentence and the second sentence in a second data structure;
determine a number of words in the first data structure;
determine a number of words in the second data structure;
compute the similarity score by dividing the number of words in the first data structure by the number of words in the second data structure.

10. The method of claim 7, wherein the machine learning model is configured to classify an input sentence based at least in part on verb tenses used in the input sentence.

11. The method of claim 7, wherein the machine learning model is configured to classify an input sentence based at least in part on a grammatical structure of the input sentence.

12. The method of claim 7, wherein receiving the set of input sentences comprises:
receiving a document comprising text;
parsing the document to identify the set of input sentences; and
extracting the set of input sentences from the document.

13. A computer program comprising executable instructions stored in a non-transitory computer readable medium that when executed by a processor causes the processor to:
receive a set of input sentences;
select a first sentence from the set of input sentences;
compare the first sentence to the plurality of previously classified sentences, wherein:
 each sentence from the plurality of the previously classified sentences is associated with a classification identifier that identifies a sentence type; and the plurality of previously classified sentences are classified based at least in part upon a plurality of sentence types comprising at least two of a factual sentence type, a predictive sentence type, or a classified information sentence type;

compute similarity scores between the first sentence and the plurality of previously classified sentences, wherein a similarity score is a numeric value that indicates how similar a pair of sentences are to each other based on the text within the pair of sentences;

identify a second sentence from the plurality of previously classified sentences with a similarity score greater than or equal to a similarity score threshold value, wherein the similarity score threshold value indicates a minimum similarity score for a pair of sentences to be considered similar to each other;

identify a sentence type for the second sentence based on a classification identifier that is linked with the second sentence, wherein the sentence type identifies a type of grammatical structure for the second sentence;

associate the first sentence with the identified sentence type for the second sentence;

add the first sentence with the identified sentence type to a set of training sentences for a machine learning model, wherein:
  the machine learning model is configured to:
    receive a sentence as an input; and
    output a classification identifier for the received sentence that indicates a sentence type;
  the set of training sentences is associated with the classification identifier for each sentence in the set of training sentences, determine a count of similarity scores between each sentence and other sentences in the set of training sentences that exceeds the similarity score threshold value;

for a given sentence in the set of training sentences, compare the count of similarity scores to an outlier threshold value, wherein the outlier threshold value indicates a minimum count value that indicates a minimum number of sentences from the set of training sentences to which the given sentence needs to be similar in order to not be considered an outlier;

remove one or more sentences from the set of training sentences that are associated with a count of similarity scores that is less than the outlier threshold value; and train the machine learning model using the set of training sentences.

14. The computer program of claim 13, wherein computing the similarity score comprises:
convert the first sentence into a first vector that comprises a first set of numeric values that correspond with a first location in a vector space;
convert the second sentence into a second vector that comprises a second set of numeric values that correspond with a second location in the vector space; and
computing the similarity score by dividing a dot product of the first vector and the second vector by a dot product of a magnitude of the first vector and a magnitude of the second vector.

15. The computer program of claim 13, wherein computing the similarity score comprises:
identifying common words between the first sentence and the second sentence;
store the identified common words in a first data structure;
store each unique word from the first sentence and the second sentence in a second data structure;
determine a number of words in the first data structure;
determine a number of words in the second data structure;
compute the similarity score by dividing the number of words in the first data structure by the number of words in the second data structure.

16. The computer program of claim 13, wherein the machine learning model is configured to classify an input sentence based at least in part on verb tenses used in the input sentence.

17. The computer program of claim 13, wherein the machine learning model is configured to classify an input sentence based at least in part on a grammatical structure of the input sentence.

* * * * *